W. D. SIDDALL & W. R. HASSELL.
POULTRY HOUSE.
APPLICATION FILED APR. 8, 1916.
1,206,149.
Patented Nov. 28, 1916.
2 SHEETS—SHEET 1.
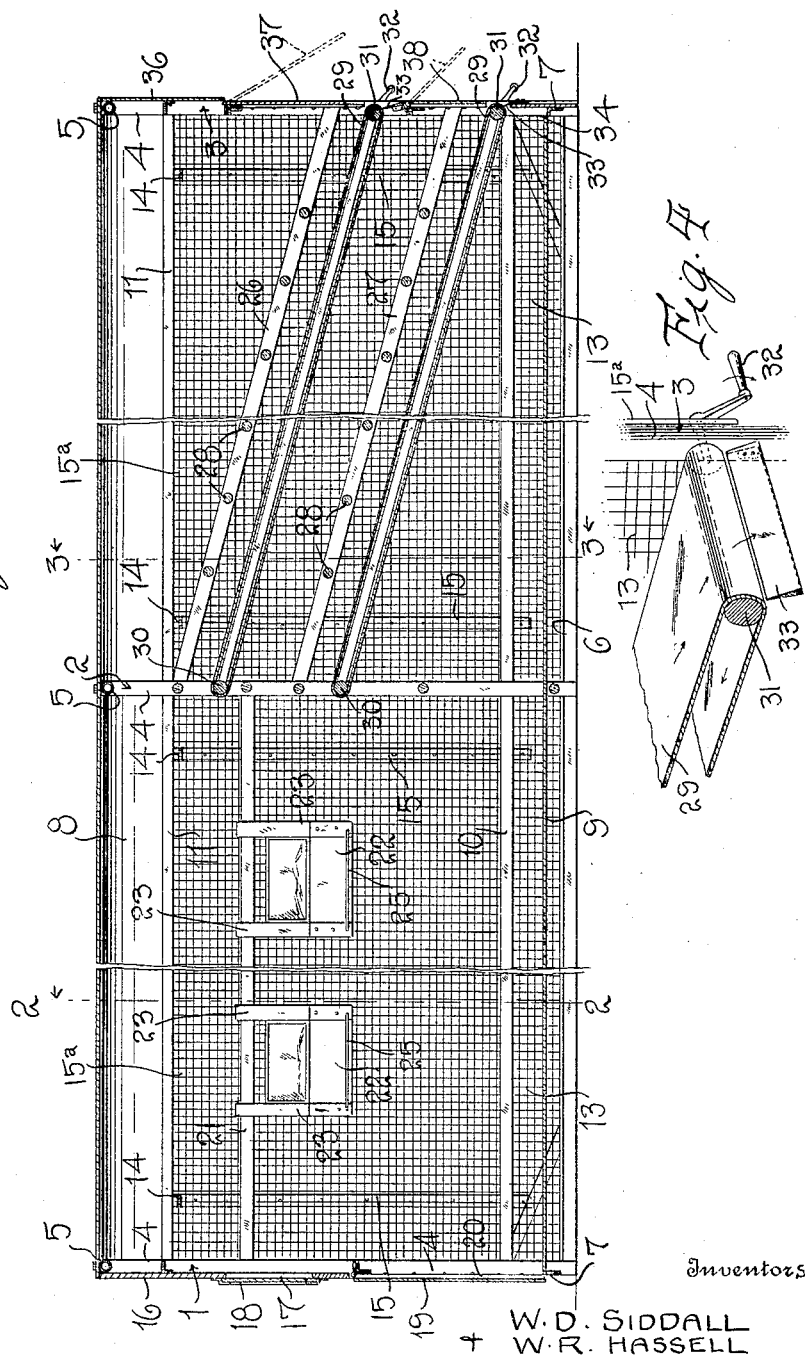
Inventors
W. D. SIDDALL
W. R. HASSELL
By Watson E. Coleman
Attorney

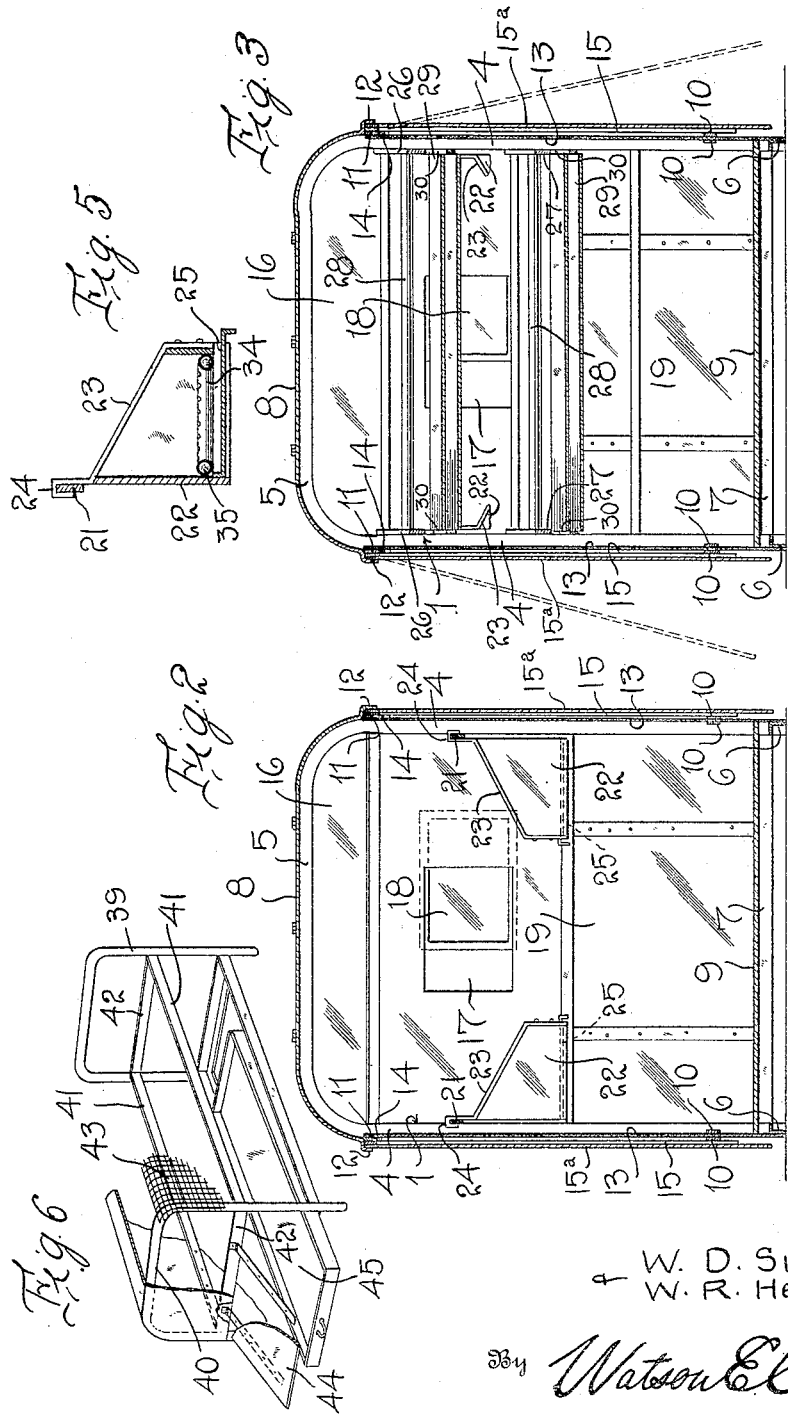

UNITED STATES PATENT OFFICE.

WILLIE D. SIDDALL AND WILLIAM R. HASSELL, OF ALVARADO, TEXAS.

POULTRY-HOUSE.

1,206,149.

Specification of Letters Patent.

Patented Nov. 28, 1916.

Application filed April 8, 1916. Serial No. 89,914.

*To all whom it may concern:*

Be it known that we, WILLIE D. SIDDALL and WILLIAM R. HASSELL, citizens of the United States, residing at Alvarado, in the county of Johnson and State of Texas, have invented certain new and useful Improvements in Poultry-Houses, of which the following is a specification, reference being had to the accompanying drawings.

This invention relates to certain improvements in poultry houses and it is an object of the invention to provide a device of this general character with novel and improved roosting means for fowls together with novel and improved means for readily cleansing the house.

With the foregoing and other objects in view, the invention consists in the novel features of construction, combination and arrangement of parts as will be hereinafter more fully described, illustrated in the accompanying drawings and claimed.

In the drawings, Figure 1 is a vertical longitudinal section through the improved poultry house; Fig. 2 is a transverse section on the line 2—2 of Fig. 1; Fig. 3 is a similar view on the line 3—3 of Fig. 1; Fig. 4 is a detail perspective illustrating the lower end of one of the movable floors as herein disclosed; Fig. 5 is a detail transverse section of one of the nests and its supporting means; and Fig. 6 is a detail perspective view with parts broken away of one of the coops.

Referring to the drawings by numerals, wherein is illustrated the preferred embodiment of our invention, 1, 2 and 3 designate the supports for the frame of the improved poultry house, the supports 1 and 3 constituting the end supports for the house, the support 2 being arranged in alinement with and between the end supports as is shown. Each of these supports is of similar construction and comprises vertically arranged side bars 4 which are connected at their upper ends by means of the cross pieces 5. Longitudinally and transversely extending bars 6 and 7 respectively are secured to the uprights 4 adjacent their lower ends to provide means for holding the supports in rigid relation, a permanent roof 8 being secured in any suitable manner to the cross pieces 5 and coöperating with the longitudinal bars to accomplish this result. The roof 8 is preferably constructed of sheet metal and extends but slightly downwardly upon the uprights 4 terminating at either side of the house adjacent the upper ends of the uprights.

A floor 9 may be mounted upon the longitudinal bars 6 and slightly above this floor and extending longitudinally of the house and being secured to the uprights 4 are other longitudinal bars 10, similar bars 11 being arranged longitudinally of the house and connected to the uprights adjacent their upper ends, the said bars 11 being arranged adjacent the longitudinal edges of the roof 8 and the roof preferably having the edges thereof bent outwardly and downwardly, as at 12 so as to overlie these bars and prevent rain or the like from passing between the roof and the bars interiorly of the house.

Secured to the bars 10 and 11 and to the uprights 4 upon either side of the housing is a reticulated material 13, the same extending preferably throughout the entire length of the sides of the housing, although it is to be understood that a portion of the sides may be formed of sheet metal, with the remaining portion of a reticulated material should it be desired to so construct the house in this manner.

Hinged to the bars 11, as at 14, are strips 15 which are of a length to extend beyond the bars 10 when the strips are in a lowered or closing position. These strips have secured thereto plates 15ᵃ which may be formed in single strips so as to overlie the entire area of each side of the house, or may be formed in sections, as desired. These plates may be swung inwardly upon the hinges 14 so as to overlie the reticulated sides 13 to inclose the house, or may be swung outwardly at any desired angle to the house so as to open the same and act as a sheltering means to shade the house and prevent rain or the like passing through the open sides. The plates 15ᵃ may be maintained in their outward or elevated adjustment in any desired manner.

One end of the housing is closed by a permanent plate 16 which may have an opening 17 therein, to be opened or closed by means of a window 18 and this end plate may also have hinged thereto a door 19 for closing the opening 20 therein.

To either side of the house and connecting the supports 1 and 2, slightly below the bars 11, are arranged other bars 21. Box-like nests 22 are provided which have secured thereto arms 23 which have their ends bent, as at 24, so that the same may be hung upon the bars 21. Thus these nests may move to any desired position longitudinally of the bars 21 without removing the same from the bers. These nests are provided with removable bottoms 25 which are slidably arranged within the boxes, whereby the nests may be readily cleaned.

Bars 26 and 27 are secured at their inner ends to the uprights 4 of the intermediate support 2 and extend downwardly from the intermediate support and are secured at their outer ends to the uprights of the end support 3, said bars being arranged in vertical spaced relation and being connected by roost bars 28.

Arranged below each pair of bars 26 and 27 is the movable floor 29 consisting of an endless member disposed around the drums 30 and 31, the drums 30 being rotatably supported by the uprights 4 of the support 2, while the drums 31 are rotatably supported by the uprights 4 of the support 3. Each of the drums 31 has operatively engaged therewith an operating crank 32 whereby the requisite movement may be imparted to the endless floor 29, and coacting with the portion of the floor passing around the drum 31, is a scraper 33 for a purpose which is believed to be self-evident.

We also find it of advantage to position within each of the nests 22 an endless tubular member 34 provided with suitable perforations and said member 34 is provided with an absorbent packing 35 adapted to be saturated with a suitable liquid which will serve to render the nest vermin-proof.

The uprights of the end support 3 have secured thereto a plate 36 which serves to close this end of the housing and this plate may be provided with openings to be closed by hinged doors 37 and 38 to provide access to the upper and lower roosts. Upon raising either of the doors and rotating either of the cranks 32, either of the floors 29 may be moved for cleansing purposes. It will also be noted that the lower ends of the bars 26 and 27 serve as stops to limit the downward or inward movement of the doors 37 and 38.

In Fig. 6 of the drawings, we have illustrated a coop which is of substantially similar construction to the housing and which is adapted to be arranged therein. This coop comprises end supports 39 and 40 which may be connected by the longitudinal and transverse bars 41 and 42 and which may be provided in a manner similar to the house, with a covering of reticulated material 43. A door 44 is hinged to one of the transverse bars 42 to provide a means of access or exit to or from the coop and by raising or opening this door, the floor 45, which is slidably mounted upon the transverse and longitudinal connecting bars, may be removed for cleaning purposes.

From the foregoing description taken in connection with the accompanying drawings, it is thought that the construction, operation and advantages of the improved poultry house will be clearly understood and, while we have herein shown and described certain specific embodiments of our invention, we do not wish to be limited thereto, except for such limitations as the claim may import.

We claim:

A poultry house including a frame comprising upstanding supports, a plurality of vertically spaced pairs of bars connecting said supports and directed on a downward incline, the bars of each pair being in transverse alinement, a series of roost bars connecting each pair of bars, an endless floor positioned beneath each series of roost bars and disposed substantially in parallelism with the bars to which said roost bars are connected, and a scraping member coacting with the lower end portion of each of the endless floors, said housing being provided with a door above the lower end of each of said endless floors and extending above the pair of bars adjacent thereto, the lower ends of the vertically spaced pairs of bars serving to limit the inward movement of the doors.

In testimony whereof we hereunto affix our signatures in the presence of two witnesses.

WILLIE D. SIDDALL.
WILLIAM B. HASSELL.

Witnesses:
H. L. GRAVES,
R. R. OWEN.

Copies of this patent may be obtained for five cents each, by addressing the "Commissioner of Patents, Washington, D. C."